(12) United States Patent
Pohlmann

(10) Patent No.: US 7,308,821 B1
(45) Date of Patent: Dec. 18, 2007

(54) ARRANGEMENT FOR DETERMINING THE PENETRATION DEPTH ON PUTTING IN PLACE SUPPORTING ELEMENTS INTO A WATER BED

(75) Inventor: Reink Pohlmann, Timmendorfer Strand (DE)

(73) Assignee: Menck GmbH, Ellerau (DE)

( * ) Notice: Subject to any disclaimer, the term of this patent is extended or adjusted under 35 U.S.C. 154(b) by 0 days.

(21) Appl. No.: 08/916,106

(22) Filed: Aug. 21, 1997

(30) Foreign Application Priority Data

Aug. 22, 1996 (DE) ................. 196 33 803

(51) Int. Cl.
*E02D 1/08* (2006.01)
*E02D 1/00* (2006.01)
*G01N 3/42* (2006.01)
*G01N 3/48* (2006.01)

(52) U.S. Cl. .................... 73/84; 73/12.01; 73/170.32
(58) Field of Classification Search ............... 73/84, 73/784, 12.01, 170.32
See application file for complete search history.

(56) References Cited

U.S. PATENT DOCUMENTS 4,186,373 A * 1/1980 Thompson ........... 73/170.32 X
4,217,709 A * 8/1980 Casciano .................... 37/308

FOREIGN PATENT DOCUMENTS

DE 3338135 A1 5/1985
GB 2165715 * 4/1986

* cited by examiner

*Primary Examiner*—Thomas P. Noland
(74) *Attorney, Agent, or Firm*—Michael J. Striker

(57) ABSTRACT

With an arrangement for determining the penetration depth (10) when putting in place supporting elements (2) into a water bed (5), according to the invention, there is provided a pressure sensor (7) for measuring the water pressure which is fastenable to the supporting element (2) or to a device (1) connected to the supporting element (2). The readings (11) supplied by the pressure sensor (7) are transmitted via a signal lead (15) to an evaluation unit (16) which determines the penetration depth (10) of the supporting element (2) from the reading differences which occur during the sinking of the pressure sensor (7) on penetration of the supporting element (2) into the water bed (5).

15 Claims, 3 Drawing Sheets

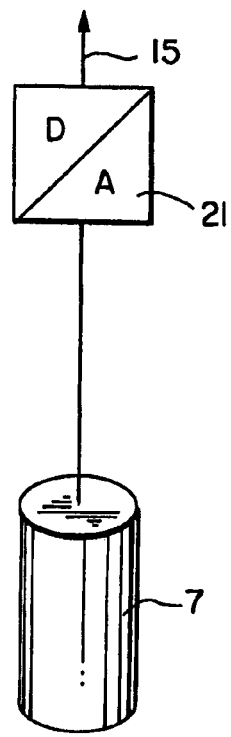
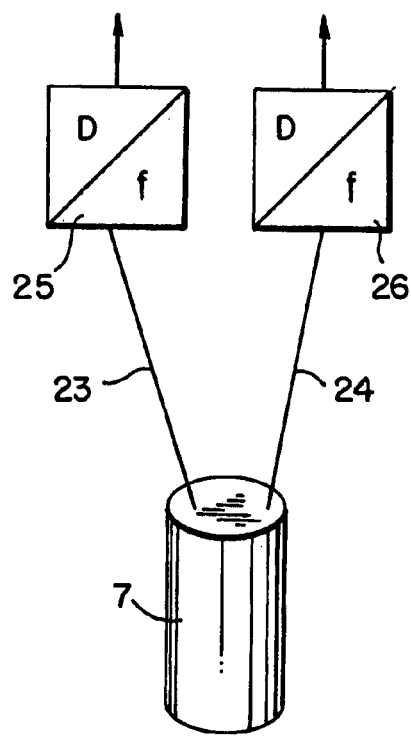
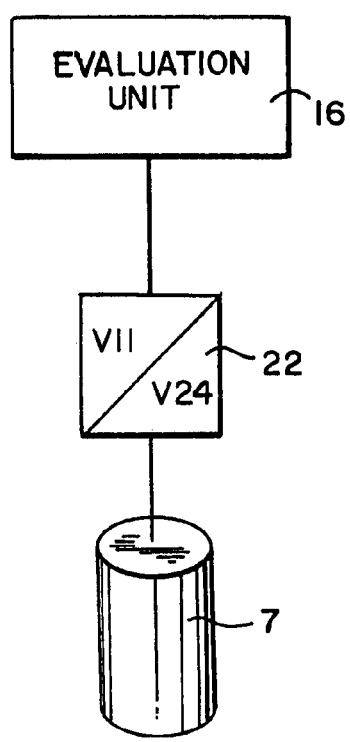

ARRANGEMENT FOR DETERMINING THE PENETRATION DEPTH ON PUTTING IN PLACE SUPPORTING ELEMENTS INTO A WATER BED

BACKGROUND OF THE INVENTION

The invention relates to an arrangement and a method for determining the penetration depth when putting in place supporting elements into a water bed.

When placing piles or beams into a water bed, information on their loading capacity is often required. Generally for this, markings at fixed distances are placed on the beam elements to be put in place and the number of pile drives which must be made by a pile device are counted in order to achieve a certain penetration depth of the beam element. The number of pile drives gives an indication of the ground conditions and loading capacity, when taking account of the energy consumed. The known method is suitable for the putting in place of beam elements through water or on land, as well as foundation work in which the beam element and the pile device are located underwater.

In the case of underwater pile-driving, which may take place in depths of more than 1000 m, with a known arrangement for determining the penetration depth, an underwater camera is employed which permits an optical control of the markings on the supporting elements. The known arrangement on the one hand has the disadvantage that underwater cameras are prone to failure and with a breakdown, lead to the costly halting of the pile-driving operation. A further disadvantage lies in the fact that for monitoring the putting in place of the beam elements, a person is required to observe a monitor, and to manually protocol the progress of penetration.

SUMMARY OF THE INVENTION

It is the object of the invention to provide an arrangement and a method for determining the penetration depth when putting in place supporting elements into a water bed, which concerns simple principles, is less prone to breakdowns and which can be automised.

This object is achieved with a arrangement according to the invention which is characterised by a pressure sensor for measuring the water pressure and which is fastenable to the supporting element or to a device connected to the supporting element, by a device for transmitting the readings supplied by the pressure sensor and by an evaluation unit for determining the reading differences which arise during the sinking of the pressure sensor on penetration of the supporting element into the water bed.

The object with regard to the method is achieved by way of the following method steps, whilst using a pressure sensor suitable for measuring water pressure and fastened underwater to a supporting element or to a device connected to the supporting element:

before the beginning or during the putting in place of a supporting element, a first reading of the pressure sensor is taken and is kept as a reference value;

after consuming a certain amount of energy for the putting in place of the supporting element or after the completion of the time interval required for this, a further reading of the pressure sensor is taken and retained, from the difference of the preceding and further readings, the penetration depth achieved by the intermediate putting in place is calculated, preferably by multiplication of the difference by a suitable calibration factor;

in the case that the desired penetration depth is not yet sufficient, the method steps from the second method step are repeated.

The arrangement according to the invention and the method according to the invention have the advantage that instead of a complicated contructed, highly sensitive and accident prone underwater camera, essentially only the pressure sensor at the location of the foundation work must be accommodated underwater at a great depth. A further advantage lies in only having to fasten the pressure sensor to the supporting element or to the device connected to the supporting element, without requiring an exact adjustment as is the case with an underwater camera. Principally, the invention lies in the fact that the pressure sensor is likewise sunk corresponding to the sinking of the supporting element into the water bed, and that from the difference in water pressure in the sunk and in the non-sunk condition, a difference in height is computed.

With this it is neither necessary for the pressure sensor to be sunk with the supporting element into the water bed nor for it to be rigidly fastened to the supporting element. On the contrary, the pressure sensor may be attached at a considerable height above the supporting element, for example on the device putting in place the supporting element into the water floor. It would also be possible to fasten the pressure sensor onto a lever which on the one hand is in connection with the device and on the other hand with a fixed point, and which transmits the sinking movement of the supporting element for example into a greater sinking of the pressure sensor.

An evaluation unit, for determining the reading differences which occur as a result of the sinking of the pressure sensor on penetration of the supporting element into the water bed, is preferably accommodated above water, for example on a ship, but it may also be accommodated underwater for example directly on the pressure sensor or a diving station located underwater for observation.

From the pressure sensor the readings reach the evaluation unit via a transmission device. With this, the transmission of readings may be effected without wire, for example by way of sound signals.

In a preferred embodiment form of the arrangement according to the invention it is however provided that the pressure sensor supplies electrical signals as readings and that these signals or signals gained by conversion are transmitted to the evaluation the occasional control by an observer is made possible.

In order to permit the use of the arrangement according to the invention in water depths of up to 2000 m which might occur, and to simultaneously ensure a measurement of the penetration depth to an accuracy of 1 cm, it is recommended that the pressure sensor is suitable for measuring absolute pressure in the order of 200 bar and has a measuring accuracy in the order of 1 mbar.

In a preferred embodiment form of the arrangement according to the invention, the signal of the pressure sensor consists of an analog electrical quantity, preferably a current which is converted via an analog to digital converter into a digital signal and is transmitted to the evaluation unit. This embodiment form is particularly recommended when the pressure sensor is located at a great water depth, for example 2000 m deep, and the evaluation unit is located on the water surface. In this case, due to the large transmission path, only a digital transmission can be considered for the transmission of the readings with the highest accuracy.

A water depth of 2000 m requires a pressure sensor which can measure absolute pressures of up to 200 bar with a resolution of 1 to 2 mbar. For transmitting such a large range of measurement with the required measuring accuracy, an analog to digital converter with a digital definition of at least 18 bits would be necessary. Such analog to digital converters are complicated and expensive.

Alternatively one may consider pressure sensors which comprise an output with a frequency which is dependent on pressure or a digital serial output, thus permitting the definition required.

Commercially available and inexpensive analog to digital converters however only have a digital resolution of 12 bits. If the measuring range for the water depth is to reach from 0 to 2000 m, with a signal transmission with 12 bits a measuring accuracy of only 0.5 m to 1 m is possible, although the analog signal of the sensor offers a considerably higher accuracy.

For solving this problem, in a further development of the invention it is provided that between the pressure sensor and the analog to digital converter there is connected an electronic subtractor and an amplifier, by which means a preselectable part measuring range may be expanded over the whole conversion range of the analog to digital converter. By way of this, the complete resolution of the analog to digital converter is available for a smaller analog part range. If for example the analog part measuring range is reduced from 2000 m to approximately 80 m, with a 12 bit analog to digital converter a resolution of 2 cm may be achieved.

A further alternative is presented by the use of pressure sensors with integrated logic for a highly accurate reading acquisition and digital data transmission interface.

If the pressure sensor is fastened to pile hammer serving to pile-drive piles into the water floor and the supply lines of the pile hammer also comprises the signal lead of the pressure sensor, it is useful that a computer provided for the monitoring and control of the pile hammer also serves the acquisition, storage and evaluation of the readings of the pressure sensor. A special computer for determining the penetration depth is not then necessary. Preferably this computer also registers the number of pile drives and computes the energy sum used for this.

With the simplest embodiment form of the method according to the invention, the penetration depth is determined from the difference of the preceding reading and the further reading in that the difference is multiplied by a suitable calibration factor. In this way one generally obtains a sufficient measuring accuracy, since under ideal conditions the calibration factor in the first approximation is the same multitude for all readings. Real pressure sensors however do not display a linear behaviour, particularly at the limits of their measuring ranges. For increasing the measuring accuracy therefore, depending on the absolute size of the reading, differing calibration factors may be employed. Particularly when using a computer for computing the differential penetration depth, this action may be carried out without a significant additional effort.

For improving the linearity and accuracy of the conversion function of pressure into depth, preferably a tidal compensation and a gravitational acceleration compensation dependent on location is carried out, as well as taking into account a depth dependent density change function of the water.

In a further development of the method according to the invention it is provided that during the measuring interval, further data is extracted and retained from the device for putting in place the supporting element, particularly data for determining the required amount of energy for putting in place the supporting element. By way of this measure, the method is improved in that not only is the simple determination of the penetration depth per se possible, but also an estimation of the resistance of the water floor to the putting in place of the supporting element into the reached penetration depth.

In a further development of the method it is provided that for each retained reading, a point in time is also registered. With this, with a later evaluation of the readings the chronological progress of the putting in place may also be represented.

The method may be further improved in that the penetration depths calculated from the readings are represented on a diagram. With this the penetration depths may be selectively plotted against time intervals, against the energy required for putting in place (number of pile drives) or also against the energy used with regard to a fixed difference in penetration depth. The representation on a diagram has the advantage that with one look one can acquire the history, progress and the status of the placing procedure, and any erroneous readings as a result of disturbances become immediately visible.

In a further development of the method, it is provided that before the beginning of the determination of the penetration depth the reading of the pressure sensor is reduced to almost zero by way of an electronic subtractor and the residual value is amplified by a predjustable multiplication factor by way of an amplifier, wherein the size of the multiplication factor is preselected such that the amplified residual value, with the maximum expected penetration depth, does not exceed the highest analog value which can be processed by a subsequently connected analog to digital converter. The advantages of this measure lie in the improved measuring accuracy with a given limited digital resolution of the analog to digital converter. By way of the mentioned adaptation of the multiplication factor, the part measuring range employed is optimally taken advantage of.

The method can be improved even further in that the reduction of the reading of the pressure sensor by way of the subtractor is automatically effected before the beginning of the determination of the penetration depth. This measure simplifies the application of the method and avoids losing time by way of erroneous operation.

The invention may also already be realised by the use of pressure sensor, known per se and suitable for measuring water pressure, for determining the penetration depth from the pressure differences arising when putting in place supporting elements into a water bed. At the same time it is useful to apply the method described earlier.

BRIEF DESCRIPTION OF THE DRAWINGS

One embodiment example of the invention is hereinafter described in more detail by way of the drawings. The figures show individually:

FIG. 3 a sensor unit with a pressure sensor and a high resolution analog to digital converter;

FIG. 4 a sensor unit with a pressure sensor and frequency exit; and

FIG. 5 a sensor unit with a pressure sensor and a digital serial interface.

DESCRIPTION OF PREFERRED EMBODIMENTS

Figure 1:
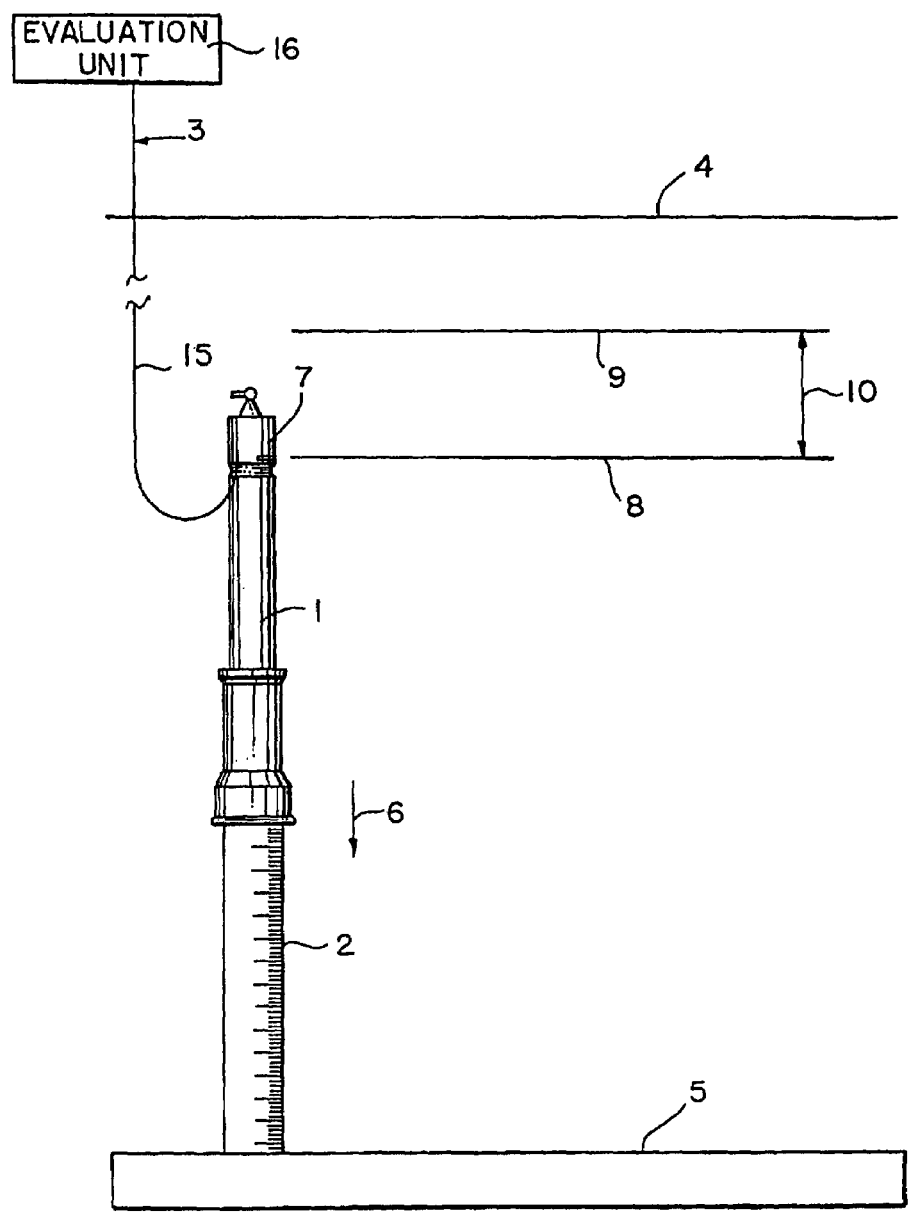
FIG. 1 a pile device on the sea bed with an arrangement according to the invention for determining the penetration depth.

In FIG. 1 there is shown a pile device with a pile hammer 1, a pile 2 and a bundle of supply lines 3. The pile hammer 1 is arranged sitting on the pile 2 underwater. The pile device is located at a large depth below the surface of the sea 4 and directly above the sea bed 5 into which the pile 2 is to be put in place. For pile-driving the pile 2, the pile hammer 1 exerts onto this a series of pile drives, wherein the pile hammer 1 together with the pile 2 sink in the direction of the arrow 6.

At the upper end of the pile hammer 1 there is fastened a pressure sensor 7 for measuring the water pressure. The pressure sensor 7 measures the water pressure corresponding to its actual depth 8 under the sea surface 4.

On sinking the pile 2 into the sea bed 5 the pressure sensor also together with the pile hammer 1 sinks, wherein the measured water pressure increases. At the beginning of the pile-driving the pressure sensor 7 is located at an initial depth 9 below the sea surface 4 at which a small water pressure is measured. The difference in depth between the initial depth 9 and the actual depth 8 corresponds to a difference in pressure which is evaluated by subtraction of the measured water pressures at the initial depth 9 and at the actual depth 8 in each case.

Figure 2:
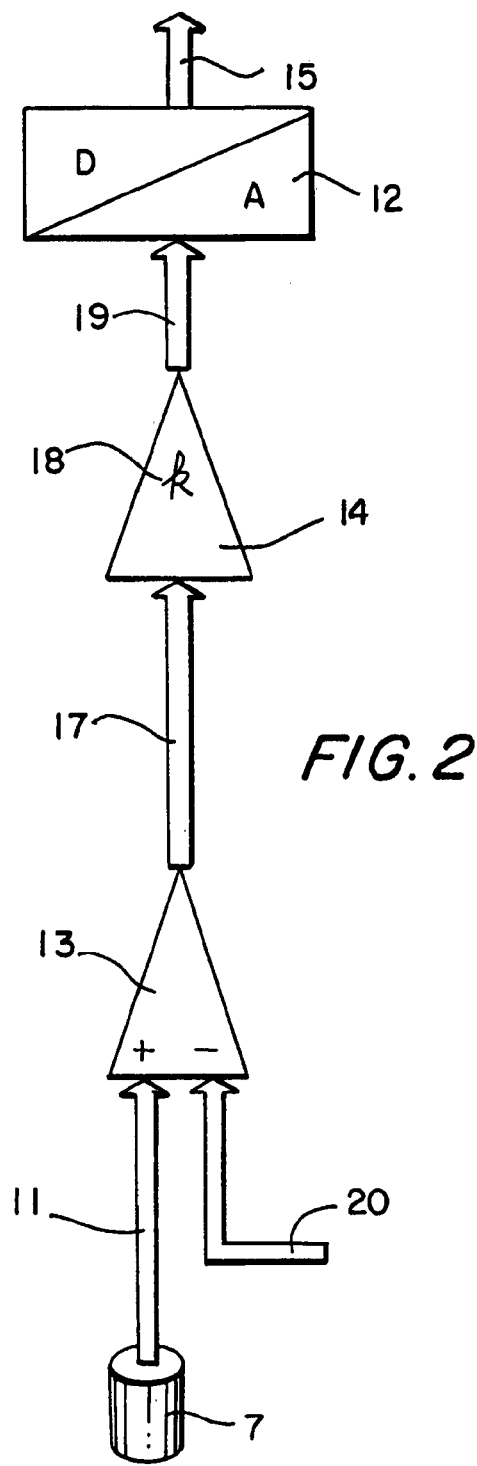
FIG. 2 a sensor unit with a pressure sensor, subtractor, amplifier and analog to digital converter.

The pressure sensor according to FIG. 2 supplies an electrical current 11 which is proportional to the pressure and which is converted into a digital signal by way of an analog to digital converter 12 and transmitted to an evaluation unit 16. Between the pressure sensor 7 and the analog to digital converter 12, an electronic subtractor 13 and an amplifier 14 are connected, these serving to expand a preselectable part measuring range of the pressure sensor 7 over the whole conversion range of the analog to digital converter 12. This procedure is described in more detail further below.

The current 11 supplied from the pressure sensor 7 is digitalized by the analog to digital converter 12 and is transmitted to an evaluation unit 16 located on an operating ship which is not shown, via an electrical signal lead 15 which is contained in the bundle of supply lines. The evaluation unit 16 comprises a computer which is not shown but which automatically acquires, stores and from the reading differences, constantly computes and displays the difference in depth 10 corresponding to the penetration depth of the pile 2.

Since such pile-driving is carried out in depths of up to 200 m below the surface of the sea 4, the pressure sensor 7 is suitable for measuring absolute pressures of up to 200 bar. On the other hand it has a measuring accuracy of 1 mbar so that the difference in depth 10 which corresponds to the penetration depth of the pile 2 may be calculated to within 1 to 2 cm.

The determination of the penetration depth of the pile 2 is effected in detail by way of the method described hereinafter.

Before the beginning of the pile-driving of the pile 2 the pressure sensor 7 is located at the initial depth 9. In this situation from the computer of the evaluation unit 16, a first reading of the pressure sensor 7 is taken and is stored as a reference value. The computer also controls and monitors the pile driver 1 and in particular registers the number of pile drives carried out from which, taking account of further technical details of the pile device, one can calculate the energy consumed for pile-driving the pile 2. After consuming a certain quantity of energy, i.e. after carrying out a certain number of pile drives, the computer registers a further reading of the pressure sensor 7 and also stores this. Following this, from the difference of the preceding and subsequent reading, by way of multiplication of this difference by a predetermined calibration factor, the computer calculates the penetration depth 10 between these readings. When the desired penetration depth is reached then the method can then here be stopped.

Generally one however desires a protocol of the pile-driving procedure in the form of a diagram with a larger number of readings which for example are plotted against time or against the number of pile drives or against the penetration depth. In these cases the method steps are repeated from the second step, i.e. after the expiry of a predetermined number of pile drives a further reading is taken, stored and from the difference from the preceding reading, a further differential penetration depth is calculated which is in turn represented on the diagram. Of course the computer may also calculate the total penetration depth achieved since the first reference value.

Since the analog to digital converter 12 used in FIG. 2 only has a digital resolution of 12 bits, the analog current 11 supplied from the pressure sensor 11 may not be processed over the whole measuring range of 200 bar with the required resolution of 1 to 2 mbar. In order however to maintain a sufficient resolution over the whole measuring range, the subtractor 13 and the amplifier 14 are connected between the pressure sensor 7 and the analog to digital converter 12.

This arrangement is represented schematically in FIG. 2. By way of a voltage 20 which is constant during the determination of the penetration depth 10, the analog voltage 11 supplied by the pressure sensor 7 is reduced to almost zero before the beginning of the above mentioned method. This may be effected without further ado in that the resetting procedure is triggered by a start signal sent from the evaluation unit 16. At the same time a suitable electronic circuit may determine and after resetting, maintain the required constant voltage 20 by measurement of the momentary voltage supplied by the pressure sensor 7.

The residual value 17 remaining at the output of the subtractor 13, as has been stated, is firstly set to almost zero, but slightly increases during the course of the pile-driving of the pile 2. In order to be able to better exploit the digital resolution of the analog to digital converter 12, the remaining residual value 17 must be amplified. This is effected in the subsequently connected amplifier 14 which effects a multiplication of the residual value 17 by an amplification factor 18. At the output of the amplifier 14 resides the amplified residual value 19 which is transmitted to the input of the analog to digital converter 12. The amplification factor 18 is preselected such that the amplified residual value 19, at the maximum expected penetration depth 10, does not exceed the analog value which can be processed by the subsequently connected analog to digital converter 12.

Due to a such an attained expansion of the part measuring range of the pressure sensor 7, despite the limited digital resolution of the analog to digital converter 12, the expanded part range is transmitted via the signal lead 15 to the evaluation unit 16 with a sufficient measuring accuracy.

With a modification of the invention represented in FIG. 3, the subtractor and amplifier are redundant since here a high resolution analog to digital converter 21 is employed which comprises a resolution of more than 12 bits.

With a further modification of the invention shown in FIG. 4, the pressure sensor 7 produces two frequency signals 23 and 24 which are digitalized in two frequency-digital transducers 25 and 26. With this, a first frequency signal 23 is dependent on the water pressure at the location of the pressure sensor 7 whilst the second frequency signal 24 is dependent on the temperature at the location of the pressure measurement and is provided for compensating temperature dependent deviations of the pressure reading.

In the evaluation unit which is not shown, the digital signals are evaluated from the frequency-digital transducers 25, 26 and the pressure at the location of the pressure sensor 7 is computed to a high accuracy. With this computation, apart from the two frequency signals 23, 24 of the pressure sensor 7, also further coefficients for correcting the reading are taken into account.

With the further modification of the invention shown in FIG. 5, the sensor unit is equipped with a digital serial interface 22 which is connected to the output of the pressure sensor 7 whose signal it digitalizes and serially transmits to the evaluation unit 16.

| List of reference numerals | |
|---|---|
| 1 | pile hammer |
| 2 | pile |
| 3 | supply lines |
| 4 | surface of the sea |
| 5 | sea bed |
| 6 | direction |
| 7 | pressure sensor |
| 8 | actual depth |
| 9 | initial depth |
| 10 | difference of depth/penetration depth |
| 11 | current |
| 12 | analog to digital converter |
| 13 | subtractor |
| 14 | amplifier |
| 15 | signal lead |
| 16 | evaluation unit |
| 17 | residual value |
| 18 | amplification factor |
| 19 | amplified residual value |
| 20 | constant voltage |
| 21 | analog to digital converter |
| 22 | digital serial interface |
| 23 | first frequency signal |
| 24 | second frequency signal |
| 25 | first frequency-digital transducer |
| 26 | second frequency-digital transducer |

The invention claimed is:

1. An arrangement for determining a penetration depth when putting in place supporting elements into a waterbed, the arrangement comprising a pressure sensor provided for measuring a water pressure and fastenable at least indirectly to a supporting element; means for transmitting readings supplied by said pressure sensor; and evaluating means for receiving the readings and determining reading differences which occur during a sinking of said pressure sensor on penetration of the supporting element into a waterbed.

2. An arrangement as defined in claim 1, wherein said pressure sensor is directly fastenable to a supporting element; and further comprising means for directly fastening said pressure sensor to the supporting element.

3. An arrangement as claim 1; and further comprising a device connected to the supporting element, said pressure sensor being fastentable to said device; and means for fastening said pressure sensor to said device.

4. An arrangement as defined in claim 1; and further comprising means for converting said reading into electrical signals; and means for transmitting the converted signals to said evaluating means and including an electrical signal lead.

5. An arrangement as defined in claim 4; and further comprising a digital serial interface through which the signals of said pressure sensor is transmitted to said evaluating means.

6. An arrangement as defined in claim 4, wherein said pressure signal is formed so that it supplies a pressure dependent frequency signal and a temperature dependent frequency signal; and further comprising two frequency-digital transducers which digitalize said frequency signals and transmit two digital signals to said evaluating means.

7. An arrangement as defined in claim 1, wherein said evaluating means include a computer which automatically acquires and stores the readings.

8. An arrangement as defined in claim 7, wherein said computer is formed so that it constantly computes and displays a penetration depth from the differences in the readings.

9. An arrangement as defined in claim 1, wherein said pressure sensor is formed so that it is suitable for measuring absolute pressure of substantially 200 bar and has a measuring accuracy of substantially 1 mbar.

10. An arrangement as defined in claim 1, wherein said pressure sensor is formed so that a signal of said pressure sensor consists of an analog electrical quantity; and further comprising an analog to digital convertor which converts the analog electrical quantity into a digital signal which is transmitted to said evaluating means.

11. An arrangement as defined in claim 10; and further comprising an electronic subtractor and an amplifier arranged between said pressure sensor and said analog to digital convertor so that a preselectable part measuring range is expandable over a whole conversion range of said analog to digital convertor.

12. An Arrangement as defined in claim 1, wherein the supporting element is a hammer serving to pile-drive piles into a water floor; and further comprising supply lines provided on the pile hammer and including said signal lead of said pressure sensor.

13. An arrangement as defined in claim 12, wherein said evaluating means include an computer which monitors and controls the pile hammer and also serves for an acquisition, storage and evaluation of the readings of said pressure sensor.

14. An arrangement as defined in claim 13, wherein said computer also registers a number of pile drives and computes an energy sum used for the pile drives.

15. An arrangement as defined in claim 1; and further comprising a digital serial interface through which the signal of said pressure sensor is transmitted to said evaluating means.

* * * * *